United States Patent
Oyanagi et al.

(10) Patent No.: US 8,192,538 B2
(45) Date of Patent: Jun. 5, 2012

(54) REDUCED-MOISTURE-CONTENT-SOLVENT INK COMPOSITION AND METHOD FOR PRODUCING THE SAME

(75) Inventors: Takashi Oyanagi, Matsumoto (JP); Kiyohiko Takemoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 66 days.

(21) Appl. No.: 12/898,760

(22) Filed: Oct. 6, 2010

(65) Prior Publication Data

US 2011/0094411 A1 Apr. 28, 2011

(30) Foreign Application Priority Data

Oct. 22, 2009 (JP) ................................. 2009-243789
Oct. 23, 2009 (JP) ................................. 2009-244806

(51) Int. Cl.
*C09D 11/02* (2006.01)
(52) U.S. Cl. ........ 106/31.6; 106/400; 106/403; 106/404
(58) Field of Classification Search .................. 106/31.6, 106/400, 403, 404
See application file for complete search history.

(56) References Cited

U.S. PATENT DOCUMENTS

| 4,990,187 A | * | 2/1991 | Dien et al. | ................. | 106/31.72 |
| 2005/0090581 A1 | | 4/2005 | Oyanagi | | |
| 2008/0145628 A1 | | 6/2008 | Oyanagi et al. | | |

FOREIGN PATENT DOCUMENTS

| JP | 2002-179960 A | 6/2002 |
| JP | 2003-292836 A | 10/2003 |
| JP | 2003-306625 A | 10/2003 |
| JP | 2005-68250 A | 3/2005 |
| JP | 2005-68251 A | 3/2005 |
| JP | 2008-174712 A | 7/2008 |

* cited by examiner

*Primary Examiner* — Emily Le
*Assistant Examiner* — Veronica F Faison
(74) *Attorney, Agent, or Firm* — Ladas & Parry LLP (57) ABSTRACT

A method for producing a reduced-moisture-content-solvent ink composition includes reducing the moisture content of a pigment dispersion containing a metal pigment and a dispersion medium or an ink composition containing the pigment dispersion and an organic solvent by bubbling treatment using an inert gas having a water vapor content of 2.0 mg/L or less.

9 Claims, 2 Drawing Sheets

FIG. 1

FIG. 2

REDUCED-MOISTURE-CONTENT-SOLVENT INK COMPOSITION AND METHOD FOR PRODUCING THE SAME

BACKGROUND

1. Technical Field

The present invention relates to reduced-moisture-content-solvent ink compositions and methods for producing the ink compositions.

2. Related Art

Nowadays, the ink-jet technology finds numerous applications in printing, one of which is metallic printing. JP-A-2002-179960, for example, discloses a technique for ink-jet printing using an ink composition containing a pigment formed of metal-coated plastic spherical particles. To achieve a highly metallic gloss, however, the spherical particles must be deformed flat so that the surfaces thereof become smooth. To that end, according to this technique, roller pressing and heating must be simultaneously performed. Thus, this technique requires a complicated apparatus and production process and also imposes limitations on recording media.

JP-A-2003-292836 and JP-A-2003-306625, on the other hand, disclose a technique using an ink composition having a colloid of a noble metal such as gold or silver dispersed therein. However, if the particle size is reduced to several to several tens of nanometers to ensure dispersion stability, the ink composition does not provide a metallic gloss because the noble metal colloid shows a color derived from plasmon absorption. In this case, a metallic gloss can be achieved by heating a dried coating at 150° C. or more to fuse the colloid particles. However, although a metallic gloss can be achieved by this technique, it is difficult to achieve a highly metallic specular gloss whose 20°, 60°, and 85° specular glossinesses exceed 200, 200, and 100, respectively, as a uniform surface without irregularities. On the other hand, if the particle size is increased to ensure a metallic gloss, the dispersion stability is decreased, and accordingly aggregation and sedimentation are inevitable, thus significantly decreasing the storage life of the ink composition.

The inventors have proposed a technique disclosed in JP-A-2008-174712 as a pigment dispersion or ink composition for solving the above problems.

The ink composition provided by the technique disclosed in the above publication is superior from the viewpoint of achieving a highly metallic specular gloss. However, a large amount of moisture may be contained in the pigment dispersion containing the metal pigment or the ink composition. In that case, the glossiness of the metal pigment can be decreased by surface corrosion resulting from a chemical reaction such as oxidation or hydroxylation or a chemical reaction promoted by water, that is, a reaction with an oxidizing or acidic gas in air (such as $SO_x$, $NO_x$, or $CO_2$). In addition, if hydrogen gas is generated as a result of the above chemical reaction, it is difficult to preserve the ink composition in an airtight container over an extended period of time. In particular, this tendency is noticeable at elevated temperatures. Thus, the above technique leaves room for improvement.

SUMMARY

An advantage of some aspects of the invention is that it provides an ink composition and a method for producing the ink composition that allow inhibition of an undesirable chemical reaction and a decrease in glossiness and generation of gas at elevated temperatures.

As a result of an intensive study, the inventors have found that an undesirable chemical reaction and a decrease in glossiness and generation of gas at elevated temperatures can be inhibited by reducing the moisture content of a pigment dispersion or ink composition either by moisture-content-reducing treatment using bubbling for a predetermined period of time or by moisture-content-reducing treatment using a predetermined molecular sieve. The invention has been made on the basis of the above findings.

A method for producing a reduced-moisture-content-solvent ink composition according to a first aspect of the invention includes reducing the moisture content of a pigment dispersion containing a metal pigment and a dispersion medium or an ink composition containing the pigment dispersion and an organic solvent by bubbling treatment using an inert gas having a water vapor content of 2.0 mg/L or less.

A method for producing a reduced-moisture-content-solvent ink composition according to a second aspect of the invention includes reducing the moisture content of a pigment dispersion containing a metal pigment and a dispersion medium or an ink composition containing the pigment dispersion and an organic solvent by bringing the pigment dispersion or the ink composition into contact with 5% by mass or more of a molecular sieve based on the amount of ink composition containing the pigment dispersion and the organic solvent.

Preferably, in the method for producing a reduced-moisture-content-solvent ink composition according to the second aspect of the invention, the molecular sieve has a pore size of 0.3 to 0.5 nm.

Preferably, in the method for producing a reduced-moisture-content-solvent ink composition according to the first aspect of the invention, the metal pigment includes flat particles whose 50% average particle size R50 based on a circle-equivalent diameter determined from the area of a principle plane of the flat particles is 0.5 to 3 μm and which satisfy the condition R50/d>5, where a is a major axis of the flat particles in the principle plane thereof, b is a minor axis of the flat particles in the principle plane thereof, and d is the thickness of the flat particles. In addition, a maximum particle size Rmax based on the circle-equivalent diameter determined from the area of the principle plane of the flat particles is 10 μm or less.

Preferably, in the method for producing a reduced-moisture-content-solvent ink composition according to the first aspect of the invention, the dispersion medium and/or the organic solvent contains at least one dispersion medium and/or organic solvent homogeneously miscible with water.

Preferably, in the method for producing a reduced-moisture-content-solvent ink composition according to the first aspect of the invention, the metal pigment is selected from the group consisting of aluminum, aluminum alloys, silver, and silver alloys.

A reduced-moisture-content-solvent ink composition according to a third aspect of the invention is produced by the method according to the first or second aspect of the invention. The moisture content of the reduced-moisture-content pigment dispersion or the reduced-moisture-content-solvent ink composition is 0.7% by mass or less.

An ink container for storing a reduced-moisture-content-solvent ink composition according to a fourth aspect of the invention incorporates a molecular sieve that reduces the moisture content of a pigment dispersion containing a metal pigment and a dispersion medium or an ink composition containing the pigment dispersion and an organic solvent. The amount of molecular sieve is 5% by mass or more based on the amount of ink composition containing the pigment dispersion and the organic solvent.

BRIEF DESCRIPTION OF THE DRAWINGS

The invention will be described with reference to the accompanying drawings, wherein like numbers reference like elements.

DESCRIPTION OF EXEMPLARY EMBODIMENTS

Reduced-Moisture-Content-Solvent Ink Composition

Composition

A reduced-moisture-content-solvent ink composition according to an embodiment of the invention contains a pigment dispersion containing a metal pigment (hereinafter also referred to as "metallic pigment") and a dispersion medium and an organic solvent. The reduced-moisture-content-solvent ink composition may further contain a resin. The components of the reduced-moisture-content-solvent ink composition will be described in detail later.

The term "moisture-content reducing treatment" as used in the invention refers to treatment for reducing the moisture content of a pigment dispersion containing a metal pigment and a dispersion medium or an ink composition containing the pigment dispersion and an organic solvent by bubbling (treatment) or by bringing it into contact with a molecular sieve.

The term "bubbling (treatment)" refers to treatment for blowing a gas such as argon or nitrogen into a pigment dispersion or ink composition. Specifically, it refers to treatment for bubbling a pigment dispersion or ink composition in a container by supplying a gas at a predetermined flow rate. The gas is supplied to the liquid phase in the container through a tube provided in the liquid phase and is discharged from the container through a tube provided in the vapor phase without contact with the liquid phase.

In addition, the terms "pigment dispersion" and "ink composition" as used in the invention refer to a pigment dispersion and an ink composition, respectively, whose moisture contents are yet to be reduced by the moisture-content reducing treatment. On the other hand, the terms "reduced-moisture-content pigment dispersion" and "reduced-moisture-content-solvent ink composition" as used in the invention refer to a pigment dispersion and an ink composition, respectively, whose moisture contents are reduced by the moisture-content reducing treatment.

Production Method

As a first example of the moisture-content reducing treatment according to the invention, a method for producing the reduced-moisture-content-solvent ink composition includes reducing the moisture content of the pigment dispersion or the ink composition by bubbling using an inert gas having a water vapor content of 2.0 mg/L or less.

Alternatively, as a second example of the moisture-content reducing treatment according to the invention, the method for producing the reduced-moisture-content-solvent ink composition includes reducing the moisture content of the pigment dispersion or the ink composition by bringing the pigment dispersion or the ink composition into contact with a predetermined molecular sieve. The term "predetermined molecular sieve" refers to 5% by mass or more of a molecular sieve based on the amount of ink composition containing the pigment dispersion and the organic solvent.

In the invention, the moisture content of the pigment dispersion does not necessarily have to be reduced. Specifically, an ink composition free from the problems with the related art described above is achieved by reducing the moisture content of at least one of the ink composition and the pigment dispersion contained therein. Accordingly, the term "pigment dispersion or ink composition (whose moisture content is to be reduced)" as used in the invention refers to at least one of the pigment dispersion and the ink composition.

The aim of the moisture-content reducing treatment according to the invention will now be described. In the related art, an ink composition incidentally contains about 0.2% to 0.3% by mass of moisture originating from an organic solvent contained therein. In addition, the ink composition absorbs moisture in air during the production of the composition, thus incidentally containing about 0.5% to 0.7% by mass of moisture. Furthermore, the ink composition can be exposed to elevated temperatures, namely, at least about 40° to 50° C., in a transportation environment during the production. At elevated temperatures, namely, about 40° to 50° C., or not lower than 60° C., the ink composition may cause problems such as generation of hydrogen gas from the ink composition. Such hydrogen gas oxidizes the surfaces of metal pigment particles and thereby decreases the glossiness thereof, thus degrading the performance of the ink composition, and also degrades the printing properties thereof.

The inventors have found that the above problem can be avoided by subjecting the pigment dispersion or the ink composition to predetermined moisture-content reducing treatment, described below.

A first example of the moisture-content reducing treatment is to bubble the pigment dispersion or the ink composition using a predetermined inert gas for a predetermined period of time. As an inert gas, for example, dry nitrogen gas introduces substantially no moisture into the ink composition because there is no possibility of moisture intrusion when the gas is produced from liquid nitrogen. Other inert gases such as helium, neon, xenon, and argon also have negligible moisture contents because they are industrially produced as high-purity gases. In addition, these inert gases contain no oxygen and therefore have no risk of generating peroxides by oxidizing the organic solvent, serving as a dispersion medium, during the bubbling.

In addition, during the bubbling, which is carried out without heating, dry gas can be introduced into the pigment to reduce the moisture content of the ink composition to about 0.1% by mass or less after the bubbling. Furthermore, substantially no gas remains in the ink composition, and accordingly the amount of gas dissolved in the composition is extremely low. Thus, the production method according to this embodiment inhibits generation of gas at elevated temperatures.

A second example of the moisture-content reducing treatment is to bring the pigment dispersion or the ink composition into contact with a predetermined molecular sieve. The molecular sieve is a synthetic zeolite formed of a synthetic crystalline hydrated metal aluminosilicate salt represented by chemical formula (1):

$$M_{2/n}O \cdot Al_2O_3 \cdot xSiO_2 \cdot yH_2O \tag{1}$$

(where M is a metal cation and n is a valence)

If the metal salt is heated to remove crystalline water therefrom, it desorbs and leaves voids that allow adsorbate molecules to be adsorbed to the inner walls thereof. For the adsorbate molecules to reach the voids, they must pass through pores of uniform diameter extending from the surface of the synthetic zeolite to the voids. Only molecules that can pass through the pores reach the inner walls of the voids, thus adsorbing to the synthetic zeolite.

The molecular sieve mainly has the five following adsorption properties. First, the molecular sieve adsorbs only molecules small enough to pass through the uniform pores. Second, the molecular sieve preferentially adsorbs polar substances such as water. Third, the molecular sieve selectively adsorbs highly unsaturated substances. Fourth, the molecular sieve has considerable adsorption ability even at extremely low adsorbate concentrations (partial pressures). Fifth, the molecular sieve has considerable adsorption ability even at relatively high temperatures.

The type of molecular sieve is not particularly limited and may be, for example, 3A, 4A, 5A, or 13X. In particular, 3A and 4A are preferred because the pore size is small enough to adsorb water but not to adsorb the organic solvent.

The average diameter of molecules capable of adsorbing to a 3A molecular sieve is about 0.3 nm or less, whereas the average diameter of molecules capable of adsorbing to a 4A molecular sieve is about 0.4 nm or less. Other types of molecular sieves such as 5A and 13X can adsorb larger molecules. Accordingly, 3A is more preferable because it can selectively adsorb water molecules, which have an average diameter of 0.27 nm, and smaller molecules such as hydrogen molecules and does not adsorb larger molecules such as those of the organic solvent.

The amount of molecular sieve used is 5% by mass or more based on the amount of ink composition containing the pigment dispersion and the organic solvent. If the amount of molecular sieve used falls below 5% by mass, the dehydration effect thereof is insufficient. Preferably, the amount of molecular sieve used is 5% to 20% by mass. If the amount of molecular sieve used is 20% by mass or less, the amount of ink composition adsorbed or absorbed is decreased, and accordingly the amount of available reduced-moisture-content-solvent ink composition is increased. More preferably, the amount of molecular sieve used is 7.5% to 15% by mass, most preferably 10% to 12.5% by mass.

Except for the predetermined moisture-content reducing treatment described above, the reduced-moisture-content-solvent ink composition can be produced by a known method. For example, first, a pigment dispersion is prepared by mixing a metallic pigment, described later, a dispersant, and a liquid medium, described later, and optionally stirring the mixture using, for example, a ball mill, a bead mill, an ultrasonic disperser, or a jet mill. The properties of the pigment dispersion are then adjusted to desired ink properties. Subsequently, an ink composition is prepared by adding a binder resin, a liquid medium, and other additives (such as a dispersion aid and a viscosity modifier) with stirring.

Alternatively, a pigment dispersion may be prepared by subjecting a pigment laminate, described later, to ultrasonic treatment in a liquid medium and then be mixed with a necessary ink liquid medium. Also, an ink composition (or reduced-moisture-content-solvent ink composition) may be directly prepared by subjecting the pigment laminate to ultrasonic treatment in an ink liquid medium. The solid content of the ink composition (or reduced-moisture-content-solvent ink composition) can be adjusted by a known method such as pressure filtration or centrifugal separation.

The removal of moisture in this embodiment can be carried out at one or more of the following steps: (i) after the preparation of a pigment dispersion using, for example, a medialess disperser such as an ultrasonic disperser or a jet mill; (ii) after the preparation of a pigment ink composition; (iii) after the mixing of a pigment dispersion with an ink liquid medium after the preparation of a pigment dispersion; and (iv) after the preparation of an ink composition by ultrasonic treatment.

Material Properties

The moisture content of the reduced-moisture-content-solvent ink composition, or the reduced-moisture-content pigment dispersion serving as a component thereof, produced by the above method is 0.7% by mass or less, preferably 0.65% by mass or less, more preferably 0.6% by mass or less, and most preferably 0.5% by mass or less. If the moisture content falls within the above range, it is possible to provide a reduced-moisture-content-solvent ink composition having superior stability at elevated temperatures, that is, a reduced-moisture-content-solvent ink composition that allows inhibition of an undesirable chemical reaction and a decrease in glossiness and generation of gas at elevated temperatures.

The method for measuring the moisture content of the reduced-moisture-content-solvent ink composition or the reduced-moisture-content pigment dispersion is not particularly limited herein, and it can be measured using, for example, the trace moisture analyzer FM-300A (manufactured by Kett Electric Laboratory).

Although the other material properties of the reduced-moisture-content-solvent ink composition according to this embodiment are not particularly limited, the surface tension thereof, for example, is preferably 20 to 50 mN/m. If the surface tension falls below 20 mN/m, the reduced-moisture-content-solvent ink composition may spread over the surface of a printer head for ink-jet recording or leak therefrom, thus making it difficult to eject ink droplets. On the other hand, if the surface tension exceeds 50 mN/m, the reduced-moisture-content-solvent ink composition may fail to spread over the surface of a recording medium, thus making it difficult to achieve excellent printing.

Metallic Pigment

The metallic pigment used in this embodiment is preferably prepared by crushing an evaporated metal film, and is preferably flat particles. In the following description, the major axis of the flat particles in the principle plane thereof is referred to as a, the minor axis of the flat particles in the principle plane thereof is referred to as b, and the thickness of the flat particles is referred to as d.

The term "flat particles" refers to particles having a substantially flat surface (principle plane) and a substantially uniform thickness (d). Because the flat particles are prepared by crushing an evaporated metal film, metal particles having a substantially flat surface and a substantially uniform thickness can be obtained. Hence, the major axis of the flat particles in the principle plane thereof can be defined as a, the minor axis of the flat particles in the principle plane thereof can be defined as b, and the thickness of the flat particles can be defined as d.

The principle plane, in other words, is an elliptical plane defined by the major axis (a) and the minor axis (b).

The term "circle-equivalent diameter" refers to the diameter of a circle having the same area as the principle plane of the flat particles of the metallic pigment projected in the thickness (d) direction of the particles of the metallic pigment. For example, if the principle plane of the flat particles of the metallic pigment is substantially polygonal, the diameter of a circle resulting from conversion of the polygonal plane projected in the thickness (d) direction into a substantially flat circle is defined as the circle-equivalent diameter of the flat particles of the metallic pigment.

The 50% average particle size R50 based on the circle-equivalent diameter determined from the area of the principle plane of the flat particles is preferably 0.5 to 3 μm, more preferably 0.75 to 2 μm, in view of metallic gloss and print stability. If the 50% average particle size R50 falls below 0.5 μm, the glossiness is insufficient. On the other hand, if the 50% average particle size R50 exceeds 3 μm, the print stability is decreased.

In addition, the relationship between the 50% average particle size R50 based on the circle-equivalent diameter and the thickness (d) preferably satisfies R50/d>5 in view of ensuring a highly metallic gloss. If R50/d is 5 or less, the glossiness is insufficient.

In addition, the maximum particle size Rmax based on the circle-equivalent diameter determined from the area of the principle plane of the flat particles is preferably 10 μm or less in view of preventing the reduced-moisture-content-solvent ink composition from clogging an ink-jet recording apparatus. If Rmax is 10 μm or less, the reduced-moisture-content-solvent ink composition can be prevented from clogging, for example, nozzles of an ink-jet recording apparatus or mesh filters provided in ink channels thereof.

The metallic pigment may be formed of any material that provides a metallic gloss. Preferably, the metallic pigment is formed of aluminum, an aluminum alloy, silver, or a silver alloy. In particular, aluminum and aluminum alloys are preferred in view of cost and ensuring a highly metallic gloss. If an aluminum alloy is used, aluminum may be alloyed with any metal or nonmetal element that provides a metallic gloss. For example, silver, gold, platinum, nickel, chromium, tin, zinc, indium, titanium, and copper are preferably used as at least one of a single element, an alloy, and a mixture.

The flat particles are prepared by, for example, sequentially forming a release resin layer and a metal or alloy layer on a sheet substrate (hereinafter referred to as "pigment laminate"), releasing the metal or alloy layer from the sheet substrate at the interface between the metal or alloy layer and the release resin layer, and crushing and pulverizing the metal or alloy layer. Of the resultant flat particles, it is preferable to extract flat particles whose sphere-equivalent 50% average particle size (D50) based on light scattering measurement, described later, is 0.8 to 1.2 μm. Alternatively, it is preferable to extract flat particles whose 50% average particle size R50 based on the circle-equivalent diameter determined from the area of the principle plane of the flat particles is 0.5 to 3 μm and which satisfy the condition R50/d>5, where a is the major axis of the flat particles in the principle plane thereof, b is the minor axis of the flat particles in the principle plane thereof, and d is the thickness of the flat particles.

Specifically, the sphere-equivalent 50% average particle size based on light scattering measurement is measured and derived as follows. That is, diffracted or scattered light is caused by irradiating particles in a dispersion medium with light and is detected using detectors disposed in front of, beside, and behind the dispersion. The point at which the distribution curve of the cumulative percentage of the measured particle sizes intersects a horizontal axis indicating a cumulative percentage of 50% is determined as the 50% average particle size.

The term "sphere-equivalent average particle size" refers to an average particle size determined from measurement results under the assumption that the particles, which are originally irregular in shape, are spherical. An example of the measurement apparatus used is the laser diffraction/scattering particle size distribution analyzer LMS-2000e (manufactured by Seishin Enterprise Co., Ltd.). If the sphere-equivalent 50% average particle size (D50) based on light scattering measurement falls within the above range, a coating having a highly metallic gloss can be formed on a printing material, and the stability of ink ejection from nozzles is also improved.

The major axis (a) and the minor axis (b) of the metallic pigment (flat particles) in the principle plane thereof and the circle-equivalent diameter thereof can be measured using a particle image analyzer. Examples of available particle image analyzers include the flow particle image analyzers FPIA-2100, FPIA-3000, and FPIA-3000S (manufactured by Sysmex Corporation).

The particle size distribution (CV) of the metallic pigment (flat particles) can be calculated by equation (1):

$$CV = (\text{standard deviation of particle size distribution} / \text{average particle size}) \times 100 \tag{1}$$

The CV is preferably 60 or less, more preferably 50 or less, and most preferably 40 or less. A metallic pigment having a CV of 60 or less provides superior print stability.

The metal or alloy layer is preferably formed by vacuum evaporation, ion plating, or sputtering.

Preferably, the metal or alloy layer has a thickness of 5 to 100 nm so that a pigment having an average thickness of 5 to 100 nm is obtained. More preferably, the metal or alloy layer has a thickness of 20 to 100 nm so that a pigment having an average thickness of 20 to 100 nm is obtained. If the thickness is 5 nm or more, the metallic pigment has superior properties such as high reflectance and brightness. If the thickness is 100 nm or less, the metallic pigment has low apparent specific gravity, thus ensuring sufficient dispersion stability.

The release resin layer of the pigment laminate, an undercoat layer for the metal or alloy layer, serves as a release layer for improving its releasability from the sheet substrate. The release resin layer is preferably formed of at least one resin selected from the group consisting of polyvinyl alcohol, poly(vinyl butyral), polyethylene glycol, poly(acrylic acid), polyacrylamide, cellulose derivatives such as cellulose acetate butyrate (CAB), acrylic polymers, and modified nylon resins.

The release resin layer is formed by, for example, applying a solution containing at least one resin to a recording medium and drying the coating. The coating solution may contain additives such as a viscosity modifier.

The resin can be applied by a commonly used method such as gravure coating, roll coating, blade coating, extrusion coating, dip coating, or spin coating. After the coating and drying, the surface is smoothed by calendering if necessary.

The thickness of the release resin layer is preferably, but not limited to, 0.5 to 50 μm, more preferably 1 to 10 μm. If the thickness falls below 0.5 μm, the amount of resin serving as a dispersing resin is insufficient. If the thickness exceeds 50 μm, the release resin layer peels easily from the pigment layer at the interface therebetween after the pigment laminate is rolled.

Examples of the sheet substrate include, but not limited to, release films such as polyester films (e.g., polytetrafluoroethylene, polyethylene, polypropylene, and polyethylene terephthalate), polyamide films (e.g., 6,6-nylon and 6-nylon), polycarbonate films, triacetate films, and polyimide films. The sheet substrate is preferably formed of polyethylene terephthalate or a copolymer thereof.

The thickness of the sheet substrate is preferably, but not limited to, 10 to 150 μm. If the thickness is 10 μm or more, the sheet can be handled without a problem during, for example, a production process. If the thickness is 150 μm or less, the sheet is so flexible as to be rolled and released without a problem.

In addition, as illustrated in JP-A-2005-68250, the metal or alloy layer may be covered with a protective layer such as a silicon oxide layer or a protective resin layer.

The silicon oxide layer may be any layer containing silicon oxide. Preferably, the silicon oxide layer is formed from a silicon alkoxide such as a tetraalkoxysilane or a polymer thereof by the sol-gel process.

The silicon oxide layer can be formed by applying an alcohol solution containing a silicon alkoxide or a polymer thereof and heating the coating.

The protective resin layer may be formed of any resin insoluble in the dispersion medium. Examples of such resins include polyvinyl alcohol, polyethylene glycol, poly(acrylic acid), polyacrylamide, and cellulose derivatives. Preferably, the protective resin layer is formed of polyvinyl alcohol or a cellulose derivative.

The protective resin layer can be formed by applying an aqueous solution of a resin or a mixture of two or more resins and drying the coating. The coating solution may contain additives such as a viscosity modifier.

The silicon oxide layer and the protective resin layer can be formed by the same coating method as the release resin layer.

The thickness of the protective layer is preferably, but not limited to, 50 to 150 nm. If the thickness falls below 50 nm, the mechanical strength is insufficient. If the thickness exceeds 150 nm, the protective layer is difficult to crush and disperse because of excessive strength, and may also peel from the metal or alloy layer at the interface therebetween.

In addition, as illustrated in JP-A-2005-68251, a colorant layer may be provided between the protective layer and the metal or alloy layer.

The colorant layer is introduced to prepare a composite pigment of any color. The colorant layer may be any layer capable of containing a colorant that imparts any hue or tone to the metallic pigment according to this embodiment in addition to the metallic gloss and brightness thereof. The colorant used for the colorant layer may be either a dye or a pigment. In addition, known dyes and pigments can be used.

In this case, the pigment used in the colorant layer is a pigment defined in the field of general pigment chemistry, such as a natural pigment, a synthetic organic pigment, or a synthetic inorganic pigment; it differs from a layered pigment such as one used in the invention.

The method for forming the colorant layer is preferably, but not limited to, coating.

In addition, if the colorant used in the colorant layer is a pigment, the colorant layer preferably further contains a colorant-dispersing resin. In this case, preferably, the pigment, the colorant-dispersing resin, and optionally other additives are dispersed or dissolved in a solvent, the solution is applied to form a uniform coating by spin coating, and the coating is dried to form a thin resin film.

In the production of the pigment laminate, it is preferable in terms of operating efficiency to form both the colorant layer and the protective layer by coating.

The pigment laminate may have a plurality of layered structures formed by sequentially forming release resin layers and metal or alloy layers (and optionally protective layers). In this case, the total thickness of the layered structures including the metal or alloy layers, that is, the total thickness of the metal or alloy layers and the release resin layers excluding those of the sheet substrate and the release resin layer directly thereabove, is preferably 5,000 nm or less. If the total thickness is 5,000 nm or less, the pigment laminate does not easily crack or peel after being rolled, thus having superior storage stability. In addition, the resultant pigment has high brightness.

Alternatively, the pigment laminate may have a layered structure formed by sequentially forming a release resin layer and a metal or alloy layer on each surface of the sheet substrate. The structure of the pigment laminate is not limited to the above structures.

The method for releasing the metal or alloy layer from the sheet substrate is preferably, but not limited to, any of the following methods: ejecting a liquid (solvent) onto the pigment laminate and then scraping and collecting the metal or alloy layer from the laminate; dipping the pigment laminate in a liquid; and dipping the pigment laminate in a liquid and simultaneously subjecting it to ultrasonic treatment to release and crush the metal or alloy layer. In these methods, the liquid used for releasing can be collected in addition to the released metal or alloy layer. Examples of the liquid (solvent) used for releasing include glycol ether solvents, lactone solvents, and mixtures thereof.

The method for crushing and pulverizing the released metal or alloy layer is not particularly limited, and a known method using, for example, a ball mill, a bead mill, an ultrasonic disperser, or a jet mill may be used. Thus, the metallic pigment is obtained.

With the pigment thus obtained, a stable dispersion can be prepared simply by dispersing it in a solvent because the release resin layer serves as a protective colloid. In addition, the resin derived from the release resin layer has the function of allowing the reduced-moisture-content-solvent ink composition containing the pigment to adhere to a recording medium such as paper.

In this embodiment, the concentration of the metallic pigment in the reduced-moisture-content-solvent ink composition is preferably 0.5% to 2% by mass for an ink set including only one type of metallic ink. If the concentration of the metallic pigment in the ink composition is 0.5% by mass to less than 1.7% by mass, a half-mirror finish, that is, a glossy finish, can be formed by ejecting an amount of ink insufficient to cover the surface to be printed. In this case, a see-through appearance can be printed. On the other hand, a metallic finish with high glossiness can be formed by ejecting an amount of ink sufficient to cover the surface to be printed. Accordingly, for example, such a reduced-moisture-content-solvent ink composition is suitable for forming a half-mirror image or a metallic finish with high glossiness on a transparent recording medium.

If the concentration of the metallic pigment in the reduced-moisture-content-solvent ink composition is 1.7% to 2.0% by mass, a matt metallic finish, rather than a highly metallic finish, can be formed because the pigment particles are randomly arranged on the printed surface. Accordingly, for example, such a reduced-moisture-content-solvent ink composition is suitable for forming a shield layer on a transparent recording medium.

The pigment dispersion (or reduced-moisture-content pigment dispersion) according to this embodiment may contain any dispersion medium capable of dispersing the metallic pigment. Examples of the dispersion medium include glycol ethers such as diethylene glycol diethyl ether, triethylene glycol monobutyl ether, dipropylene glycol dimethyl ether, dipropylene glycol diethyl ether, and ethylene glycol monoallyl ether; ether acetates such as propylene glycol methyl ether acetate; lactones such as γ-butyrolactone; and alcohols such as isopropyl alcohol.

Organic Solvent

The organic solvent used in this embodiment is preferably, but not limited to, a polar organic solvent. Examples of polar organic solvents include, but are not limited to, alcohols (such as methyl alcohol, ethyl alcohol, propyl alcohol, butyl alcohol, isopropyl alcohol, and fluorinated alcohols), ketones (such as acetone, methyl ethyl ketone, and cyclohexanone), carboxylic acid esters (such as methyl acetate, ethyl acetate, propyl acetate, butyl acetate, methyl propionate, and ethyl propionate), and ethers (such as diethyl ether, dipropyl ether, tetrahydrofuran, and dioxane). These organic solvents may be used alone or in a combination of two or more.

If two or more organic solvents are used in the reduced-moisture-content-solvent ink composition, the dispersion medium and/or the organic solvents preferably contain at least one dispersion medium and/or organic solvent homogeneously miscible with water. More preferably, the dispersion medium and/or the organic solvents are a dispersion medium and/or organic solvents homogeneously miscible with water.

In particular, the organic solvent preferably contains one or more alkylene glycol ethers that are liquid at normal temperature and pressure.

Examples of such alkylene glycol ethers include ethylene glycol ethers and propylene glycol ethers based on an alkyl (such as methyl, n-propyl, i-propyl, n-butyl, butyl, hexyl, or 2-ethylhexyl), allyl, which has a double bond, and phenyl. Such ethers have no color and little smell, behave both as an alcohol and an ether because of the ether and hydroxyl groups in the molecules thereof, and are liquid at room temperature. In addition, the ethers include monoethers, in which only one of the hydroxyl groups is substituted, and diethers, in which the two hydroxyl groups are substituted, and they can be used in combination.

In addition, the organic solvent is preferably a mixture of at least two compounds selected from the group consisting of alkylene glycol diethers, alkylene glycol monoethers, and lactones.

Examples of alkylene glycol monoethers include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol dimethyl ether, diethylene glycol diethyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, dipropylene glycol monomethyl ether, and dipropylene glycol monoethyl ether.

Examples of alkylene glycol diethers include ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

In addition, as derivatives of the above ethers, alkylene glycol monoalkyl ether acetates can be used. Examples of alkylene glycol monoalkyl ether acetates include ethylene glycol monoethyl ether acetate, diethylene glycol monoethyl ether acetate, propylene glycol monoethyl ether acetate, and dipropylene glycol monoethyl ether acetate.

Examples of lactones include γ-butyrolactone, δ-valerolactone, and ε-caprolactone.

In such a case, the advantages of the invention are more effective and reliable.

Resin

Examples of resins that can be used in the reduced-moisture-content-solvent ink composition according to this embodiment include acrylic resins produced from acrylic acid esters and/or methacrylic acid esters, styrene-acrylic resins produced by copolymerization of the above esters with styrene, rosin-modified resins, terpene resins, modified terpene resins, polyester resins, polyamide resins, epoxy resins, vinyl chloride resins, vinyl chloride-vinyl acetate copolymers, fiber-based resins (e.g., cellulose acetate butyrate and hydroxylpropyl cellulose), poly(vinyl butyral), polyacrylic polyols, polyvinyl alcohol, polyurethanes, and hydrogenated petroleum resins.

The resin used may also be a nonaqueous emulsion of polymer microparticles (nonaqueous dispersion (NAD)). This is a dispersion having microparticles, such as of a polyurethane resin, an acrylic resin, or an acrylic polyol resin, stably dispersed in an organic solvent.

Examples of polyurethane emulsions include Sanprene IB-501 and Sanprene IB-F370 (manufactured by Sanyo Chemical Industries, Ltd). Examples of acrylic polyol resin emulsions include N-2043-60MEX (manufactured by Harima Chemicals, Inc).

The resin emulsion is preferably added to the reduced-moisture-content-solvent ink composition in an amount of 0.1% to 10% by mass to facilitate adhesion of the pigment to a recording medium. If the amount added is excessive, the print stability is insufficient. If the amount added is insufficient, the adhesion is insufficient. From the same viewpoint, the concentration of the resin in the reduced-moisture-content-solvent ink composition is preferably 0.05% to 1.5% by mass, more preferably 0.1% to 1.0% by mass, still more preferably 0.15% to 0.35% by mass, and most preferably 0.15% to 0.25% by mass.

The resin contained in the reduced-moisture-content-solvent ink composition is preferably at least one compound selected from the group consisting of poly(vinyl butyral), cellulose acetate butyrate, and polyacrylic polyols, and is more preferably cellulose acetate butyrate. In this case, desirable effects such as good wear resistance and adhesion and a highly metallic gloss after drying can be achieved.

Other Components

The reduced-moisture-content-solvent ink composition according to this embodiment preferably further contains at least one compound selected from the group consisting of glycerol, polyalkylene glycols, and saccharides in a total amount of 0.1% to 10% by mass. In this case, ink drying and clogging can be prevented to stabilize ink ejection, thus improving the image quality of a recorded material.

Polyalkylene glycols are linear polymer compounds having ether bonds repeated in the main chains thereof and are produced by, for example, ring-opening polymerization of cyclic ethers.

Examples of polyalkylene glycols include polymers such as polyethylene glycol and polypropylene glycol, copolymers such as ethylene oxide-propylene oxide copolymers, and derivatives thereof. As for copolymers, any type of copolymer, such as a random copolymer, a block copolymer, a graft copolymer, or an alternating copolymer, can be used.

A preferred example of a polyalkylene glycol is represented by chemical formula (2):

$$HO-(C_nH_{2n}O)_m-H \quad (2)$$

(where n is an integer of 1 to 5 and m is an integer of 1 to 100)

In the above formula, the integer n in $(C_nH_{2n}O)_m$ may be either a single constant or a combination of two or more constants within the above range. For example, if n is 3, the formula is $(C_3H_6O)_m$, and if n is a combination of 1 and 4, the formula is $(CH_2O-C_4H_8O)_m$. In addition, the integer m may be either a single constant or a combination of two or more constants within the above range. For example, if m is a combination of 20 and 40 in the above example, the formula is $(CH_2O)_{20}$—$(C_4H_8O)_{40}$, and if m is a combination of 10 and 30, the formula is $(CH_2O)_{10}$—$(C_4H_8O)_{30}$. In addition, the integers n and m may be selected in any combination within the above ranges.

Examples of saccharides include monosaccharides such as pentoses, hexoses, heptoses, and octoses; polysaccharides such as disaccharides, trisaccharides, and tetrasaccharides; and derivatives thereof, including reduced derivatives such as sugar alcohols and deoxy sugars, oxidized derivatives such as aldonic acids and uronic acids, dehydrated derivatives such as glycoseens, amino sugars, and thio sugars. The term "polysaccharides" refers to sugars in a broad sense and encompasses naturally occurring substances such as alginic acid, dextrin, and cellulose.

The reduced-moisture-content-solvent ink composition according to this embodiment preferably further contains at least one acetylene glycol surfactant and/or at least one silicone surfactant. The surfactant is preferably added in an amount of 0.05% to 0.3% by mass, more preferably 0.2% to 0.3% by mass, of the total amount of reduced-moisture-content-solvent ink composition.

In this case, the affinity (wettability) of the reduced-moisture-content-solvent ink composition to a recording medium can be improved, thus providing quick adhesion.

Examples of preferred acetylene glycol surfactants include Surfynol 465 (trademark) and Surfynol 104 (trademark) (manufactured by Air Products and Chemicals, Inc.) and Olfine STG (trademark) and Olfine E1010 (trademark) (trade names, manufactured by Nissin Chemical Industry Co., Ltd.).

The silicone surfactant used is preferably a polyester-modified silicone or a polyether-modified silicone. Examples of such silicones include BYK-347, BYK-348, BYK-UV3500, BYK-UV3570, BYK-UV3510, and BYK-UV3530 (manufactured by BYK-Chemie Japan K.K.).

Thus, according to this embodiment, a reduced-moisture-content-solvent ink composition and a method for producing the reduced-moisture-content-solvent ink composition can be provided that allow inhibition of an undesirable chemical reaction and a decrease in glossiness and generation of gas at elevated temperatures.

Ink Set

An ink set according to an embodiment of the invention includes a plurality of reduced-moisture-content-solvent ink compositions described above. These reduced-moisture-content-solvent ink compositions have different metallic pigment concentrations.

Preferably, at least one of the reduced-moisture-content-solvent ink compositions has a metallic pigment concentration of 0.5% by mass to less than 1.0% by mass, whereas at least one other reduced-moisture-content-solvent ink composition has a metallic pigment concentration of 1.0% to 2.0% by mass.

Ink Container

An ink container according to an embodiment of the invention is, for example, an ink storage container or an ink cartridge as described later. If an ink container is used, it is preferable to reduce the moisture content of the reduced-moisture-content-solvent ink composition to be stored in the ink container and/or the reduced-moisture-content pigment dispersion contained therein by bubbling treatment for four or more hours in advance.

In this embodiment, the ink container used for storing the reduced-moisture-content-solvent ink composition incorporates a predetermined amount of molecular sieve for reducing the moisture content of the reduced-moisture-content pigment dispersion or the reduced-moisture-content-solvent ink composition. The term "predetermined amount of molecular sieve" refers to 5% by mass or more of molecular sieve based on the amount of ink composition containing the pigment dispersion and the organic solvent. In this case, the molecular sieve in the ink composition acts effectively on the reduced-moisture-content pigment dispersion or the reduced-moisture-content-solvent ink composition.

If the ink container incorporating the molecular sieve is used, the reduced-moisture-content-solvent ink composition to be stored in the ink container and/or the reduced-moisture-content pigment dispersion contained therein may be one whose moisture content is reduced by bringing it into contact with a molecular sieve in advance, as described above, or may be one whose moisture content is not reduced.

Recording Apparatus

A recording apparatus according to an embodiment of the invention is an ink-jet recording apparatus including the above ink set.

Figure 1:
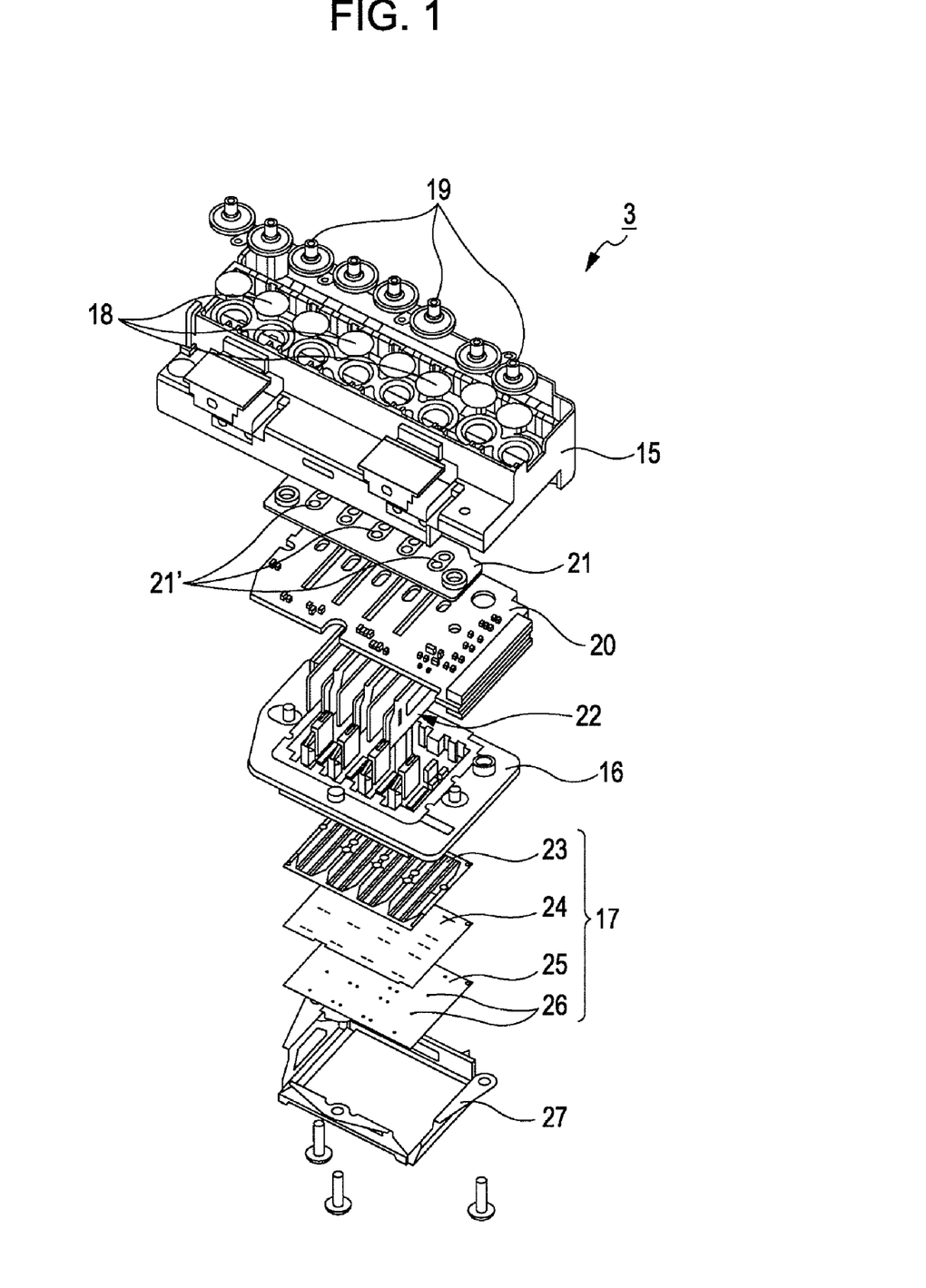
FIG. 1 is an exploded perspective view showing the structure of a recording head.
Figure 2:
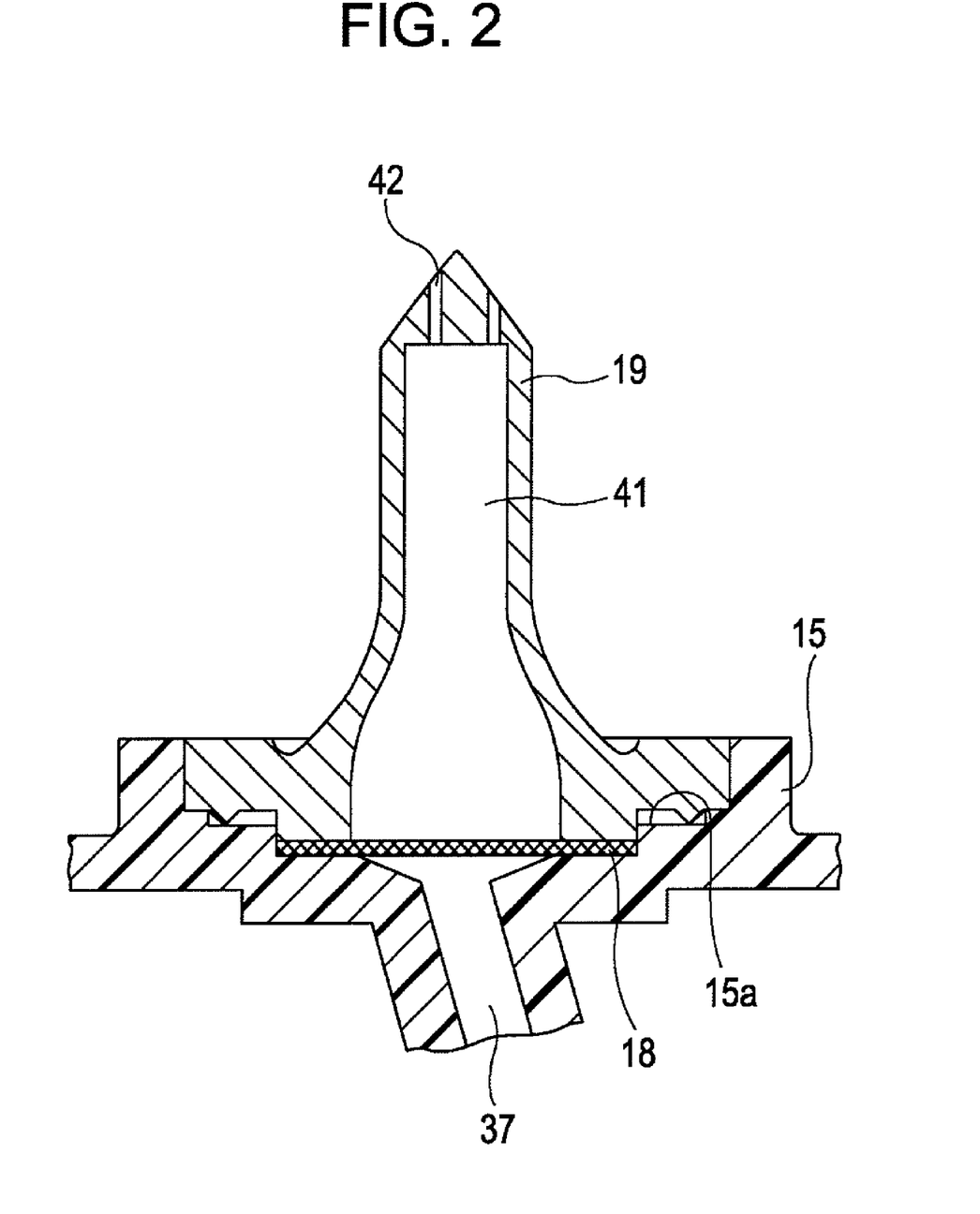
FIG. 2 is a sectional view showing the structure of an ink-introducing needle.

The structure of a recording head of the ink-jet recording apparatus will now be described. FIG. 1 is a schematic perspective view of a recording head accommodated in a carriage (not shown). FIG. 2 is a sectional view of an ink-introducing needle to be inserted into an ink cartridge.

As shown in FIG. 1, a recording head 3 includes a cartridge base (hereinafter referred to as "base") 15. A head case 16 is attached to the base 15. A channel unit 17 is attached to (provided at) an end of the head case 16. The base 15 is formed of, for example, a synthetic resin. A plurality of segments 15a (regions where a liquid-storing member is attached) are provided in the top surface of the base 15.

Ink-introducing needles 19 are attached to the individual segments 15a with mesh filters 18 therebetween. An ink cartridge (not shown) is attached to the segments 15a. That is, the ink cartridge is disposed on the base 15. The ink-introducing needles 19 to be inserted into the ink cartridge will be described in detail later.

A circuit board 20 is attached to the surface of the base 15 opposite the segments 15a. The circuit board 20 is attached to the base 15 with a sheet member 21, functioning as a gasket, therebetween.

The head case 16 is a casing fixed to the base 15 and accommodating a vibrator unit 22 having piezoelectric vibrators. The channel unit 17 is fixed to the end surface of the head case 16 opposite the surface where the base 15 is attached using, for example, an adhesive. The channel unit 17 is prepared by sequentially stacking an elastic plate 23, a channel-forming substrate 24, and a nozzle plate 25 and bonding them together using, for example, an adhesive.

The nozzle plate 25 is a plate member formed from, for example, a thin stainless steel plate and has fine nozzle orifices 26 arranged in an array at a pitch corresponding to the dot density of a printer. In addition, a head cover 27 is formed of, for example, a thin metal plate.

As shown in FIG. 2, each ink-introducing needle 19 to be inserted into the ink cartridge is a hollow needle having a conical upstream end and an inner ink-introducing channel 41, and the lower half thereof is tapered from the downstream side to the upstream side. In addition, an ink-introducing hole 42 is provided at the end of the ink-introducing needle 19 so that the ink-introducing channel 41 communicates with the outer space.

The ink-introducing needle 19 is attached to the base 15 with the mesh filter 18 shown in FIG. 1 therebetween by, for example, ultrasonic welding. Thus, the ink-introducing channel 41 of the ink-introducing needle 19 communicates with an ink communication channel 37 of the head case 16.

As an ink cartridge (not shown) is attached to the segments 15a of the base 15, the ink-introducing needles 19 are inserted into needle insertion ports of the ink cartridge so that the ink-introducing channels 41 of the ink-introducing needles 19 communicate with the inner space of the ink cartridge via the ink-introducing holes 42. Subsequently, the ink stored in the ink cartridge is introduced into the ink-introducing channels 41 via the ink-introducing holes 42 and is ejected from the nozzle orifices 26 via the ink communication channels 37.

If the diameter of the nozzle orifices 26 of the recording head 3 of the ink-jet recording apparatus is L μm and the opening size of the mesh filters 18 provided in the ink-introducing channels 41 is W μm, the relationship $L \geq 5W$ is preferably satisfied. If the reduced-moisture-content-solvent ink composition according to the embodiment described above is used for an ink-jet recording apparatus satisfying the above relationship, the following condition is preferably satisfied in view of preventing the nozzle orifices 26 from being clogged with the metallic pigment and thereby ensuring the ejection stability of the reduced-moisture-content-solvent ink composition. That is, if the average particle size based on the circle-equivalent diameter determined from the area of the principle plane of the flat particles is R μm, the number of flat particles satisfying the condition $R > (L/5)$ is preferably 5% or less of the total number of flat particles.

Ink-Jet Recording Method

An ink-jet recording method according to an embodiment of the invention includes ejecting droplets of the above reduced-moisture-content-solvent ink composition onto a recording medium, thus performing recording.

In view of angular dependence, it is preferable to form an image having a metallic gloss whose 20°, 60°, and 85° specular glossinesses specified in JIS Z8741 on a recording medium are measured to be simultaneously 200 or more, 200 or more, and 100 or more, respectively. More preferably, the 20°, 60°, and 85° specular glossinesses specified in JIS Z8741 are measured to be simultaneously 400 or more, 400 or more, and 100 or more, respectively. Most preferably, the 20°, 60°, and 85° specular glossinesses specified in JIS Z8741 are measured to be simultaneously 600 or more, 600 or more, and 100 or more, respectively.

JIS Z8741 (date of establishment: May 30, 1959; date of revision: Sep. 20, 1997) is a standard of Japanese Industrial Standards (JIS) for the methods of measuring specular glossiness. The specular glossiness is represented as the percentage of the intensity of light reflected by a particular surface at the same angle as the light is incident thereon, namely, specularly reflected light, to the intensity of light reflected by a reference surface under the same conditions. That is, the specular glossiness indicates how glossy the particular surface is. For example, the glossiness measured at an incident angle of 60° and a reflection angle of 60° with respect to the normal is referred to as the 60° specular glossiness. In addition, the reference surface used for measuring the specular glossiness is a glass surface having a refractive index of 1.567.

An image having a metallic gloss whose 20°, 60°, and 85° specular glossinesses specified in JIS Z8741 are measured to be simultaneously 200 to less than 400, 200 to less than 400, and 100 or more, respectively, has a dull (matt) metallic gloss.

An image having a metallic gloss whose 20°, 60°, and 85° specular glossinesses specified in JIS Z8741 are measured to be simultaneously 400 to less than 600, 400 to less than 600, and 100 or more, respectively, has such a highly metallic superior gloss that an object reflected in the image can be slightly recognized.

An image having a metallic gloss whose 20°, 60°, and 85° specular glossinesses specified in JIS Z8741 are measured to be simultaneously 600 or more, 600 or more, and 100 or more, respectively, has sharpness. The image has such a highly metallic gloss that an object reflected in the image can be clearly recognized, that is, a specular gloss.

Accordingly, in the ink-jet recording method according to this embodiment, images having metallic glosses whose 20°, 60°, and 85° specular glossinesses specified in JIS Z8741 on a recording medium are measured to be simultaneously 200 or more, 200 or more, and 100 or more, respectively, are appropriately combined. Thus, images having desired metallic glosses, ranging from matt images to glossy images, can be formed.

On the other hand, an image having a metallic gloss whose 20°, 60°, and 85° specular glossinesses are not measured to be simultaneously 200 or more, 200 or more, and 100 or more, respectively, has no metallic gloss as visually observed and looks gray. In addition, the above effect cannot be achieved if one of the 20°, 60°, and 85° specular glossinesses measured falls below the above ranges.

The amount of reduced-moisture-content-solvent ink composition ejected onto a recording medium is preferably 0.1 to 100 mg/cm$^2$, more preferably 1.0 to 50 mg/cm$^2$, in view of metallic gloss, printing process, and cost.

The dry weight of metallic pigment forming an image on a recording medium is preferably 0.0001 to 3.0 mg/cm$^2$ in view of metallic gloss, printing process, and cost. The lower the dry weight of the metallic pigment is, the glossier the resultant metallic finish is. Accordingly, for example, such a reduced-moisture-content-solvent ink composition is suitable for forming a half-mirror image on a transparent recording medium.

On the other hand, the higher the dry weight of the metallic pigment is, the matter the resultant metallic finish is. Accordingly, for example, such a reduced-moisture-content-solvent ink composition is suitable for forming a shield layer on a transparent recording medium.

Examples of the method for ejecting the reduced-moisture-content-solvent ink composition include those described below.

A first method uses electrostatic attraction. According to this method, ink droplets are continuously ejected from a nozzle by applying a strong electric field between the nozzle and an acceleration electrode disposed in front of the nozzle and are deflected by deflection electrodes on the basis of print information signals while traveling between the deflection electrodes, thus performing recording. Alternatively, ink droplets are ejected on the basis of print information signals without deflection.

A second method uses forced ejection of ink droplets by mechanically vibrating a nozzle using, for example, a quartz vibrator while applying pressure to the ink using a small pump. The ink droplets are ejected while being electrically charged and are deflected by deflection electrodes on the basis of print information signals while traveling between the deflection electrodes, thus performing recording.

A third method uses a piezoelectric element. According to this method, ink droplets are ejected by applying pressure to the ink using the piezoelectric element while supplying print information signals, thus performing recording.

A fourth method uses sudden volume expansion of ink by the effect of thermal energy. According to this method, ink droplets are ejected by heating and bubbling the ink using microelectrodes on the basis of print information signals, thus performing recording.

Any of the above methods can be used for the ink-jet recording method according to this embodiment. For high-speed printing, however, the reduced-moisture-content-solvent ink composition is preferably ejected by a non-heating method, that is, the first, second, or third method.

The type of recording medium is not particularly limited, and various recording media can be used, including plain paper, ink-jet paper (matt paper and glossy paper), glass, plastic films such as poly(vinyl chloride) films, films coated with plastic or accepting layers, metal, and printed circuit boards.

If the recording medium has an ink-accepting layer, printing is preferably performed without heating the recording medium in view of avoiding heat damage.

On the other hand, if the recording medium has no ink-accepting layer, printing is preferably performed while heating the recording medium in view of increasing drying speed and achieving high glossiness.

Examples of the heating method include heating the recording medium by bringing it into contact with a heat source and heating the recording medium without contact, for example, by irradiating it with infrared light or microwave (electromagnetic wave having a peak wavelength of about 2,450 MHz) or by blowing hot air.

The heating is preferably performed at one or more of the following timings: before the printing, at the same time as the printing, and after the printing. In other words, the recording medium may be heated before, at the same time as, or after the printing, or throughout the printing. The heating temperature is preferably 30° C. to 80° C., more preferably 40° C. to 60° C., depending on the type of recording medium.

Because the ink-jet recording method according to this embodiment uses the above reduced-moisture-content-solvent ink composition, an undesirable chemical reaction and a decrease in glossiness and generation of gas at elevated temperatures can be inhibited.

Recorded Material

A recorded material according to an embodiment of the invention is a recording medium onto which the reduced-moisture-content-solvent ink composition is ejected by the above ink-jet recording method. Because the recorded material is produced by the ink-jet recording method using the above ink set, it has superior print stability. In addition, the recorded material has a highly metallic specular gloss whose 20°, 60°, and 85° specular glossinesses are measured to be 200 or more, 200 or more, and 100 or more, respectively. Furthermore, any metallic gloss, ranging from a specular gloss to a matt appearance, can be simultaneously formed because the reduced-moisture-content-solvent ink compositions in the ink set have different metallic pigment concentrations.

COMMON EXAMPLE

1. Preparation of Metallic Pigment Dispersion

A resin-layer coating solution containing 3% by mass of cellulose acetate butyrate (butylation rate: 35% to 39%; manufactured by Kanto Chemical Co., Inc.) and 97% by mass of diethylene glycol diethyl ether (manufactured by Nippon Nyukazai Co., Ltd.) was uniformly applied onto a PET film having a thickness of 100 μm by bar coating. The coating was dried at 60° C. for ten minutes, thus forming a thin resin layer on the PET film.

Next, an evaporated aluminum layer having an average thickness of 20 nm was formed on the resin layer using a vacuum evaporation system (the vacuum evaporation system VE-1010, manufactured by Vacuum Device Inc.).

Next, the laminate formed by the above method was simultaneously subjected to releasing, pulverization, and dispersion treatment in diethylene glycol diethyl ether using the ultrasonic dispersion apparatus VS-150 (manufactured by AS ONE Corporation), thus preparing a metallic pigment dispersion, where the total ultrasonic dispersion treatment time was 8 hours.

The resultant metallic pigment dispersion was filtered through a stainless mesh filter having an opening size of 5 μm to remove coarse particles. The filtrate was then poured into a round-bottom flask and was distilled using a rotary evaporator to remove diethylene glycol diethyl ether, thus condensing the metallic pigment dispersion. Subsequently, the pigment concentration of the metallic pigment dispersion was adjusted, thus obtaining a metallic pigment dispersion having a pigment concentration of 5% by mass.

According to measurement using the laser diffraction/scattering particle size distribution analyzer LMS-2000e (manufactured by Seishin Enterprise Co., Ltd.), the sphere-equivalent 50% average particle size (D50) of the metallic pigment based on light scattering measurement was 1.001 μm. In addition, the maximum particle size was 5.01 μm.

According to measurement using the trace moisture analyzer FM-300A (manufactured by Kett Electric Laboratory), the moisture content of the metallic pigment dispersion was 0.58% by mass. In addition, the moisture content of the diethylene glycol diethyl ether (manufactured by Nippon Nyukazai Co., Ltd.) was 0.38% by mass.

2. Preparation of Metallic Pigment Ink Composition

A metallic pigment ink composition containing the components shown in Table 1 was prepared using the metallic pigment dispersion prepared by the method described above. Specifically, an ink solvent was prepared by mixing and dissolving additives in a solvent, was mixed with the metallic pigment dispersion, and was stirred using a magnetic stirrer at normal temperature and pressure for 30 minutes, thus preparing a common metallic pigment ink composition for use in Examples A and B, described later.

The diethylene glycol diethyl ether (DEGdEE) and tetraethylene glycol dimethyl ether (TEGDM) used were manufactured by Nippon Nyukazai Co., Ltd. The γ-butyrolactone used was manufactured by Kanto Chemical Co., Inc. The cellulose acetate butyrate (CAB) was manufactured by Kanto Chemical Co., Inc. (butylation rate: 35% to 39%). BYK-W3500 (surfactant) was manufactured by BYK-Chemie Japan K.K. The values are expressed in percent by mass.

TABLE 1

|  | Ink composition (% by mass) |
| --- | --- |
| Metallic pigment dispersion (solid content) | 1.5 |
| Diethyiene glycol diethyl ether | 68.1 |
| γ-Butyrolactone | 15.0 |
| Tetraethylene glycol dimethyl ether | 15.0 |
| Cellulose acetate butyrate | 0.2 |
| BYK-UV3500 | 0.2 |

Example A

3. Bubbling Treatment

First, 300 mL of the metallic pigment dispersion or the ink composition was poured into 500 mL trap-equipped three-necked flasks (manufactured by AS ONE Corporation). A regulator was then used to adjust the flow rate of dry nitrogen having a nitrogen content of 99.5% by mass and a water vapor content of 0.2 mg/L or less to 500 mL/min. Subsequently, the three-necked flasks were equipped with Kerami Filter (B-type, 10 mm in diameter×180 mm in length, manufactured by AS ONE Corporation) connected to transparent tubes having superior gas barrier properties. In this way, as shown in Table 2, the metallic pigment dispersion and the ink composition was bubbled using dry nitrogen, serving as an inert gas, for predetermined periods of time (Examples 1A to 3A).

As comparative examples, as shown in Table 2, the case where bubbling was not performed (Comparative Example 1A) and the case where bubbling was performed by supplying air at 25° C. and a relative humidity (RH) of 50%, instead of dry nitrogen, at a flow rate of 500 mL/min using a compressor (Comparative Example 2A) were evaluated.

TABLE 2

|  | Bubbling time (hours) |
|---|---|
| Example 1A Dry nitrogen | 12 |
| Example 2A Dry nitrogen | 8 |
| Example 3A Dry nitrogen | 4 |
| Comparative Example 1A Not bubbled | 0 |
| Comparative Example 2A Air (50% RH) | 8 |
| Comparative Example 3A Dry nitrogen | 2 |

4. Heat Resistance Evaluation Test

After the bubbling, the reduced-moisture-content-solvent ink compositions were left standing for more than 24 hours to remove air bubbles, and 30 g of each ink composition was placed in three-sided seal bags formed of a multilayer film composed of three layers, namely, a polyester film, an evaporated aluminum film, and a polyethylene film. The three-sided seal bags were heat-sealed so as not to contain air bubbles, thus preparing ink storage containers (seal bags).

According to measurement using PERMATRAN/W (manufactured by Hitachi High-Technologies Corporation), the water vapor permeability of the multilayer film was 0.01 g/m²·day.

After these storage containers were left standing at 40° C., 50° C., or 60° C. for one week, they were checked for air bubbles due to generation of gas. Specifically, the contents of the ink storage bags were removed using 50 mL syringes (SS-50LZ, manufactured by Terumo Corporation) and were visually checked for air bubbles. The ink compositions were evaluated as A (excellent) if no air bubbles were visually observed, were evaluated as B (good) if the volume of air bubbles was less than 1 cc, and were evaluated as C (poor) if the volume of air bubbles was 1 cc or more.

TABLE 3

| | Type | 40° C., 1 week | 50° C., 1 week | 60° C., 1 week | 65° C., 1 week |
|---|---|---|---|---|---|
| Example 1A | Seal bag 30 mL of ink composition | A | A | A | A |
| Example 2A | Seal bag 30 mL of ink composition | A | A | A | A |
| Example 3A | Seal bag 30 mL of ink composition | A | A | A | A |
| Comparative Example 1A | Seal bag 30 mL of ink composition | A | A | A | C |
| Comparative Example 2A | Seal bag 30 mL of ink composition | A | B | C | C |
| Comparative Example 3A | Seal bag 30 mL of ink composition | A | A | A | B |

In addition, the metallic pigment dispersions were evaluated under the same conditions as in Examples 1A to 3A and Comparative Examples 1A to 3A. The results are shown as Examples 4A to 6A and Comparative Examples 4A to 6A.

TABLE 4

| | Type | 40° C., 1 week | 50° C., 1 week | 60° C., 1 week |
|---|---|---|---|---|
| Example 4A | Seal bag 30 mL of metallic pigment dispersion | A | A | B |
| Example 5A | Seal bag 30 mL of metallic pigment dispersion | A | A | B |
| Example 6A | Seal bag 30 mL of metallic pigment dispersion | A | A | B |
| Comparative Example 4A | Seal bag 30 mL of metallic pigment dispersion | A | B | C |
| Comparative Example 5A | Seal bag 30 mL of metallic pigment dispersion | A | B | C |
| Comparative Example 6A | Seal bag 30 mL of metallic pigment dispersion | A | B | C |

The above results demonstrate that bubbling using dry nitrogen significantly improves the heat resistance of a metallic pigment dispersion or ink composition, that is, provides a significant effect of inhibiting generation of gas at elevated temperatures.

5. Glossiness Evaluation Test

After the ink composition was treated under the same conditions as in the examples and the comparative examples shown in Table 2, 100 g of each ink composition was placed in three-sided seal bags formed of a multilayer film composed of three layers, namely, a polyester film, an evaporated aluminum film, and a polyethylene film. The three-sided seal bags were heat-sealed so as not to contain air bubbles, thus preparing ink storage containers (sealed bags). The ink storage containers were then subjected to a heat resistance test at 40° C. for five days or at 65° C. for five days (Reference Example A, Examples 7A to 12A, and Comparative Examples 7A to 12A). Subsequently, each ink composition was charged into a black cartridge for the ink-jet printer EM-930C (manufactured by Seiko Epson Corporation) and was used to perform solid printing on A4-sized glossy photographic paper (product number: KA4100PSKR; manufactured by Seiko Epson Corporation) in a high-resolution mode at room temperature. A glossiness measurement was carried out using the glossmeter GM-286 (manufactured by Konica Minolta Holdings, Inc.). Reference Example A corresponds to a control experiment. The results are shown in Table 5 below.

TABLE 5

|  | Bubbling conditions | Heating conditions | 20° gloss-iness | 60° gloss-iness | 85° gloss-iness |
|---|---|---|---|---|---|
| Reference Example A | — | Unheated | 659 | 541 | 121 |
| Example 7A | Same as Example 1A | 40° C., 5 days | 660 | 540 | 121 |
| Example 8A | Example 1A | 65° C., 5 days | 659 | 539 | 121 |
| Example 9A | Same as Example 2A | 40° C., 5 days | 662 | 542 | 121 |
| Example 10A | Example 2A | 65° C., 5 days | 660 | 540 | 121 |
| Example 11A | Same as Example 3A | 40° C., 5 days | 658 | 541 | 121 |
| Example 12A | Example 3A | 65° C., 5 days | 657 | 541 | 121 |
| Comparative Example 7A | Same as Comparative Example 1A | 40° C., 5 days | 655 | 540 | 120 |
| Comparative Example 8A | Example 1A | 65° C., 5 days | 622 | 531 | 120 |
| Comparative Example 9A | Same as Comparative Example 2A | 40° C., 5 days | 652 | 539 | 120 |
| Comparative Example 10A | Example 2A | 65° C., 5 days | 610 | 528 | 118 |
| Comparative Example 11A | Same as Comparative Example 3A | 40° C., 5 days | 657 | 540 | 120 |
| Comparative Example 12A | Example 3A | 65° C., 5 days | 625 | 533 | 119 |

It was found that the ink compositions of Examples 7A to 12A, where the moisture content was reduced, had high glossiness comparable to that of Reference Example A, serving as a control experiment, after the heat resistance test, whereas the ink compositions of Comparative Examples 7A to 12A, where the moisture content was not or only slightly reduced, had significantly decreased glossiness.

The above results demonstrate that the moisture content of an ink composition or a metallic pigment dispersion serving as a component thereof can be significantly reduced by bubbling it using a predetermined inert gas for a predetermined period of time. In addition, the results demonstrate that such a reduced-moisture-content-solvent ink composition has superior high-temperature stability at 40° C. or more, that is, a superior effect of inhibiting generation of gas at elevated temperatures. Furthermore, the results demonstrate that a printout prepared using the reduced-moisture-content-solvent ink composition has excellent glossiness.

Example B

6. Moisture Content Evaluation Test

First, 100 mL of the metallic pigment dispersion or the ink composition was poured into 500 mL plastic bottles (Ai-Boy wide-mouth bottle, manufactured by AS ONE Corporation) incorporating a molecular sieve (manufactured by Nacalai Tesque, Inc.). As shown in Table 6, the ink composition and the metallic pigment dispersion were left standing at 25° C. and 50% RH for one week or at 40° C. and 90% RH for three weeks (Examples 1B and 2B). In addition, as shown in FIG. 6, the ink composition and the metallic pigment dispersion were treated in the same manner as in Examples 1B and 2B except that no molecular sieve was incorporated (Comparative Examples 1A and 2B). Subsequently, the moisture contents of the ink compositions and the metallic pigment dispersions were measured using the trace moisture analyzer FM-300A (manufactured by Kett Electric Laboratory). The results are shown in Table 6, where the initial moisture contents indicate the values before the test.

TABLE 6

|  | Type | Initial moisture content (% by mass) | Moisture content after 1 week at 25° C. and 50% RH (% by mass) | Moisture content after 3 weeks at 40° C. and 90% RH (% by mass) |
|---|---|---|---|---|
| Example 1B | 500 mL plastic bottle 100 g of ink composition 10 g of 3A molecular sieve | 0.66 | 0.57 | 0.56 |
| Example 2B | 500 mL plastic bottle 100 g of metallic pigment dispersion 10 g of 3A molecular sieve | 0.58 | 0.55 | 0.55 |
| Comparative Example 1B | 500 mL plastic bottle 100 g of ink composition | 0.66 | 0.66 | 0.76 |
| Comparative Example 2B | 500 mL plastic bottle 100 g of metallic pigment dispersion | 0.58 | 0.58 | 0.67 |

As shown in Table 6, the molecular sieve reduced the moisture contents of the ink composition and the metallic pigment dispersion while they were left standing and also inhibited an increase in moisture content after three weeks at high temperature and humidity, that is, at 40° C. and 90% RH.

In addition, the moisture content was similarly measured with varying types and amounts of molecular sieve added (Examples 3B to 6B and Comparative Example 3B). The results are shown in Table 7.

TABLE 7

| | Type | Initial moisture content (% by mass) | Moisture content after 1 week at 25° C. and 50% RH (% by mass) | Moisture content after 3 weeks at 40° C. and 90% RH (% by mass) |
|---|---|---|---|---|
| Example 3B | 500 mL plastic bottle 100 g of ink composition 5 g of 3A molecular sieve | 0.66 | 0.58 | 0.57 |
| Example 4B | 500 mL plastic bottle 100 g of ink composition 20 g of 3A molecular sieve | 0.66 | 0.57 | 0.57 |
| Example 5B | 500 mL plastic bottle 100 g of ink composition 10 g of 4A molecular sieve | 0.66 | 0.60 | 0.60 |
| Example 6B | 500 mL plastic bottle 100 g of ink composition 10 g of 5A molecular sieve | 0.66 | 0.60 | 0.60 |
| Comparative Example 3B | 500 mL plastic bottle 100 g of ink composition 2.5 g of 3A molecular sieve | 0.66 | 0.62 | 0.71 |

It was found that an increase in moisture content can be more effectively inhibited by adding 5% by mass or more of molecular sieve, that a molecular sieve having a pore size of 0.3 to 0.5 nm is more effective, and that a 3A molecular sieve, which has a pore size of 0.3 nm, is most effective.

A preliminary test carried out before the tests shown in Tables 6 and 7 above revealed the above moisture content has the relationship represented in Table 8 below.

TABLE 8

| | Initial moisture content (% by mass) | Moisture content after 1 year at 25° C. and 50% RH (% by mass) | Moisture content after 3 weeks at 40° C. and 90% RH (% by mass) |
|---|---|---|---|
| DEGdEE | 0.38 | 0.51 | 0.53 |
| Ink composition | 0.66 | — | 0.76 |

As shown in Table 8, the same evaluation test as in Comparative Example 1B was carried out using diethylene glycol diethyl ether instead of the ink composition. As a result, it was found that the sample left standing at 25° C. and 50% RH for one year had substantially the same moisture content as the sample left standing at 40° C. and 90% RH for three weeks. Accordingly, the condition that an ink composition be left standing at 40° C. and 90% RH for three weeks is assumed to be equivalent to the condition that an ink composition be left standing at 25° C. and 50% RH for one year. The tests shown in Tables 6 and 7 are based on that assumption.

7. Heat Resistance Evaluation Test

First, 30 g of the ink composition was placed in three-sided seal bags formed of a multilayer film composed of three layers, namely, a polyester film, an evaporated aluminum film, and a polyethylene film. The three-sided seal bags were heat-sealed so as not to contain air bubbles, thus preparing ink storage containers (sealed bags).

According to measurement using PERMATRAN/W (manufactured by Hitachi High-Technologies Corporation), the water vapor permeability of the multilayer film was 0.01 g/m²·day.

After these storage containers were left standing at 40° C., 50° C., or 60° C. for one week, they were checked for air bubbles due to generation of gas. Specifically, the contents of the ink storage bags were removed using 50 mL syringes (SS-50LZ, manufactured by Terumo Corporation) and were visually checked for air bubbles. The ink compositions were evaluated as A (excellent) if no air bubbles were visually observed, were evaluated as B (good) if the volume of air bubbles was less than 1 cc, and were evaluated as C (poor) if the volume of air bubbles was 1 cc or more.

The conditions of Examples 7B and 8B in the heat resistance evaluation test are the same as those of Examples 1B and 3B, respectively.

In addition, as Comparative Examples 4B and 5B, samples were prepared under the same conditions as in Example 7B except that more moisture was contained in the ink composition and no molecular sieve was used. As Comparative Example 6B, samples were prepared under the same conditions as in Example 7B except that no molecular sieve was used. As Comparative Example 7B, samples were prepared under the same conditions as in Example 7B except that more moisture was contained in the ink composition. Comparative Examples 4B to 7B were subjected to the above heat resistance evaluation test. The results are shown in Table 9 below.

TABLE 9

| | Type | 40° C., 1 week | 50° C., 1 week | 60° C., 1 week |
|---|---|---|---|---|
| Example 7B | Seal bag 30 g of ink composition 3 g of 3A molecular sieve | A | A | A |
| Example 8B | Seal bag 30 g of ink composition 1.5 g of 3A molecular sieve | A | A | A |
| Comparative Example 4B | Seal bag 29.9 g of ink composition 0.1 g of ion exchange water | A | B | C |
| Comparative Example 5B | Seal bag 29.8 g of ink composition 0.2 g of ion exchange water | A | B | C |
| Comparative Example 6B | Seal bag 30.0 g of ink composition | A | B | B |
| Comparative Example 7B | Seal bag 29.8 g of ink composition 0.2 g of ion exchange water 3 g of 3A molecular sieve | A | A | B |

A sample containing not less than 0.4 mL of ion exchange water could not be evaluated because a large amount of gas was generated and punctured the sealed bag.

As described above, the conditions of Examples 7B and 8B are the same as those of Examples 1B and 3B, respectively. These ink compositions can be used without containing air bubbles after the ink compositions or the storage containers containing the ink compositions are exposed to a thermal history.

8. Glossiness Evaluation Test

Under the same conditions as in Example 7B and Comparative Example 4B, 100 g of the ink composition was placed in three-sided seal bags formed of a multilayer film composed of three layers, namely, a polyester film, an evaporated aluminum film, and a polyethylene film. The three-sided seal bags were heat-sealed so as not to contain air bubbles, thus preparing ink storage containers (sealed bags). The ink storage containers were then subjected to a heat resistance test at 40° C. for five days or at 60° C. for five days (Examples 9B and 10B and Comparative Examples 8B and 9B). Subsequently, each ink composition was charged into a black cartridge for the ink-jet printer EM-930C (manufactured by Seiko Epson Corporation) and was used to perform solid printing on A4-sized glossy photographic paper (product number: KA4100PSKR; manufactured by Seiko Epson Corporation) in a high-resolution mode at room temperature. A glossiness measurement was carried out using the gloss-meter GM-286 (manufactured by Konica Minolta Holdings, Inc.). The results are shown in Table 10 below.

TABLE 10

| | Type | 20° glossiness | 60° glossiness | 85° glossiness |
|---|---|---|---|---|
| Reference Example B Unheated | Seal bag 100 g of ink composition | 839 | 593 | 125 |
| Example 9B 40° C., 5 days | Seal bag 100 g of ink composition 10 g of 3A molecular sieve | 837 | 599 | 125 |
| Example 10B 60° C., 5 days | Seal bag 100 g of ink composition 10 g of 3A molecular sieve | 835 | 596 | 125 |
| Comparative Example 8B 40° C., 5 days | Seal bag 99.7 g of ink composition 0.3 g of ion exchange water | 793 | 586 | 125 |
| Comparative Example 9B 60° C., 5 days | Seal bag 99.7 g of ink composition 0.3 g of ion exchange water | 786 | 576 | 124 |

The moisture contents of the ink compositions of Examples 9B and 10B are assumed to be 0.56% by mass due to the effect of a molecular sieve. On the other hand, the moisture contents of the ink compositions of Comparative Examples 8B and 9B are assumed to be 0.96% by mass, which is the sum of the initial moisture content of the ink composition, namely, 0.66% by mass, and the moisture content originating from ion exchange water, namely, 0.3% by mass.

It was found that the ink compositions of Examples 9B and 10B, where the moisture content was reduced, had high glossiness comparable to that of Reference Example B, serving as a control experiment, after the heat resistance test, whereas the ink composition of Comparative Example 8B, where the moisture content was increased by adding ion exchange water, had decreased glossiness even though generation of gas was not observed. In addition, it was found that the ink composition of Comparative Example 9B, where generation of gas was observed, had further decreased glossiness.

The above results demonstrate that the moisture content of an ink composition and/or a metallic pigment dispersion serving as a component thereof can be significantly reduced by bringing it into contact with a molecular sieve. In addition, the results demonstrate that such a reduced-moisture-content-solvent ink composition has superior high-temperature stability at 40° C. or more, that is, a superior effect of inhibiting generation of gas at elevated temperatures. Furthermore, the results demonstrate that a printout prepared using the reduced-moisture-content-solvent ink composition has excellent glossiness.

What is claimed is:

1. A method for producing a reduced-moisture-content-solvent ink composition, the method comprising reducing the moisture content of a pigment dispersion containing a metal pigment and a dispersion medium or an ink composition containing the pigment dispersion and an organic solvent by bubbling treatment using an inert gas having a water vapor content of 2.0 mg/L or less.

2. A method for producing a reduced-moisture-content-solvent ink composition, the method comprising reducing the moisture content of a pigment dispersion containing a metal pigment and a dispersion medium or an ink composition containing the pigment dispersion and an organic solvent by bringing the pigment dispersion or the ink composition into contact with 5% by mass or more of a molecular sieve based on the amount of ink composition containing the pigment dispersion and the organic solvent.

3. The method for producing a reduced-moisture-content-solvent ink composition according to claim 2, wherein the molecular sieve has a pore size of 0.3 to 0.5 nm.

4. The method for producing a reduced-moisture-content-solvent ink composition according to claim 1, wherein
the metal pigment includes flat particles whose 50% average particle size R50 based on a circle-equivalent diameter determined from the area of a principle plane of the flat particles is 0.5 to 3 µm and which satisfy the condition R50/d>5, where a is a major axis of the flat particles in the principle plane thereof, b is a minor axis of the flat particles in the principle plane thereof, and d is the thickness of the flat particles; and
a maximum particle size Rmax based on the circle-equivalent diameter determined from the area of the principle plane of the flat particles is 10 µm or less.

5. The method for producing a reduced-moisture-content-solvent ink composition according to claim 1, wherein the dispersion medium and/or the organic solvent contains at least one dispersion medium and/or organic solvent homogeneously miscible with water.

6. The method for producing a reduced-moisture-content-solvent ink composition according to claim 1, wherein the metal pigment is selected from the group consisting of aluminum, aluminum alloys, silver, and silver alloys.

7. A reduced-moisture-content-solvent ink composition produced by the method according to claim 1, wherein the moisture content of the reduced-moisture-content pigment dispersion or the reduced-moisture-content-solvent ink composition is 0.7% by mass or less.

8. An ink container for storing a reduced-moisture-content-solvent ink composition, the ink container incorporating a molecular sieve that reduces the moisture content of a pigment dispersion containing a metal pigment and a dispersion medium or an ink composition containing the pigment dispersion and an organic solvent, wherein the amount of molecular sieve is 5% by mass or more based on the amount of ink composition containing the pigment dispersion and the organic solvent.

9. A reduced-moisture-content-solvent ink composition produced by the method according to claim 2, wherein the moisture content of the reduced-moisture-content pigment dispersion or the reduced-moisture-content-solvent ink composition is 0.7% by mass or less.

* * * * *